United States Patent
Yenney et al.

(10) Patent No.: US 8,570,940 B1
(45) Date of Patent: Oct. 29, 2013

(54) METHOD AND SYSTEM FOR OPERATING DENSELY-DEPLOYED LOW-COST INTERNET BASE STATIONS (LCIBS)

(75) Inventors: Christopher M. Yenney, Ashburn, VA (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 876 days.

(21) Appl. No.: 12/400,920

(22) Filed: Mar. 10, 2009

(51) Int. Cl.
*H04W 4/00* (2009.01)
*H04W 80/04* (2009.01)
*H04W 88/06* (2009.01)

(52) U.S. Cl.
CPC .............. *H04W 80/04* (2013.01); *H04W 88/06* (2013.01)
USPC ............................ 370/328; 370/331; 455/450

(58) Field of Classification Search
USPC .......................... 370/328, 331; 455/67.11, 450
See application file for complete search history.

(56) References Cited

U.S. PATENT DOCUMENTS

| 5,475,870 | A | 12/1995 | Weaver, Jr. et al. |
| 5,584,049 | A | 12/1996 | Weaver, Jr. et al. |
| 5,878,328 | A | 3/1999 | Chawla et al. |
| 2005/0148368 | A1* | 7/2005 | Scheinert et al. ............. 455/561 |
| 2009/0042578 | A1* | 2/2009 | Rinne et al. .................... 455/442 |
| 2009/0129263 | A1* | 5/2009 | Osborn ......................... 370/230 |
| 2010/0178921 | A1* | 7/2010 | Aqvist et al. .................. 455/436 |

OTHER PUBLICATIONS

Unpublished U.S. Appl. No. 11/781,829, entitled "Multi-Carrier Capacity Increase in Low-Cost Internet Base Station (LCIB) Systems by Logical Grouping of Base Stations", filed Jul. 23, 2007, in the name of Timothy W. Sill et al.

* cited by examiner

*Primary Examiner* — Ricky Ngo
*Assistant Examiner* — Richard K Chang

(57) ABSTRACT

Methods and systems are provided for operation of densely-deployed low-cost Internet base stations (LCIBs). In an embodiment, an LCIB controller determines that a plurality of LCIBs are densely deployed. The LCIB controller then selects respective densely-deployed operational parameters for each respective LCIB in the plurality. After selecting the respective parameters, the LCIB controller configures each respective LCIB in the plurality to operate according to the respective densely-deployed operational parameters.

16 Claims, 4 Drawing Sheets

METHOD AND SYSTEM FOR OPERATING DENSELY-DEPLOYED LOW-COST INTERNET BASE STATIONS (LCIBS)

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

Overview

Methods and systems are provided for configuring operational parameters for densely-deployed LCIBs. In one embodiment, an LCIB controller determines that a plurality of LCIBs are densely deployed. The LCIB controller selects respective densely-deployed operational parameters for each respective LCIB in the plurality. The LCIB controller then configures each respective LCIB in the plurality to operate according to the respective densely-deployed operational parameters.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
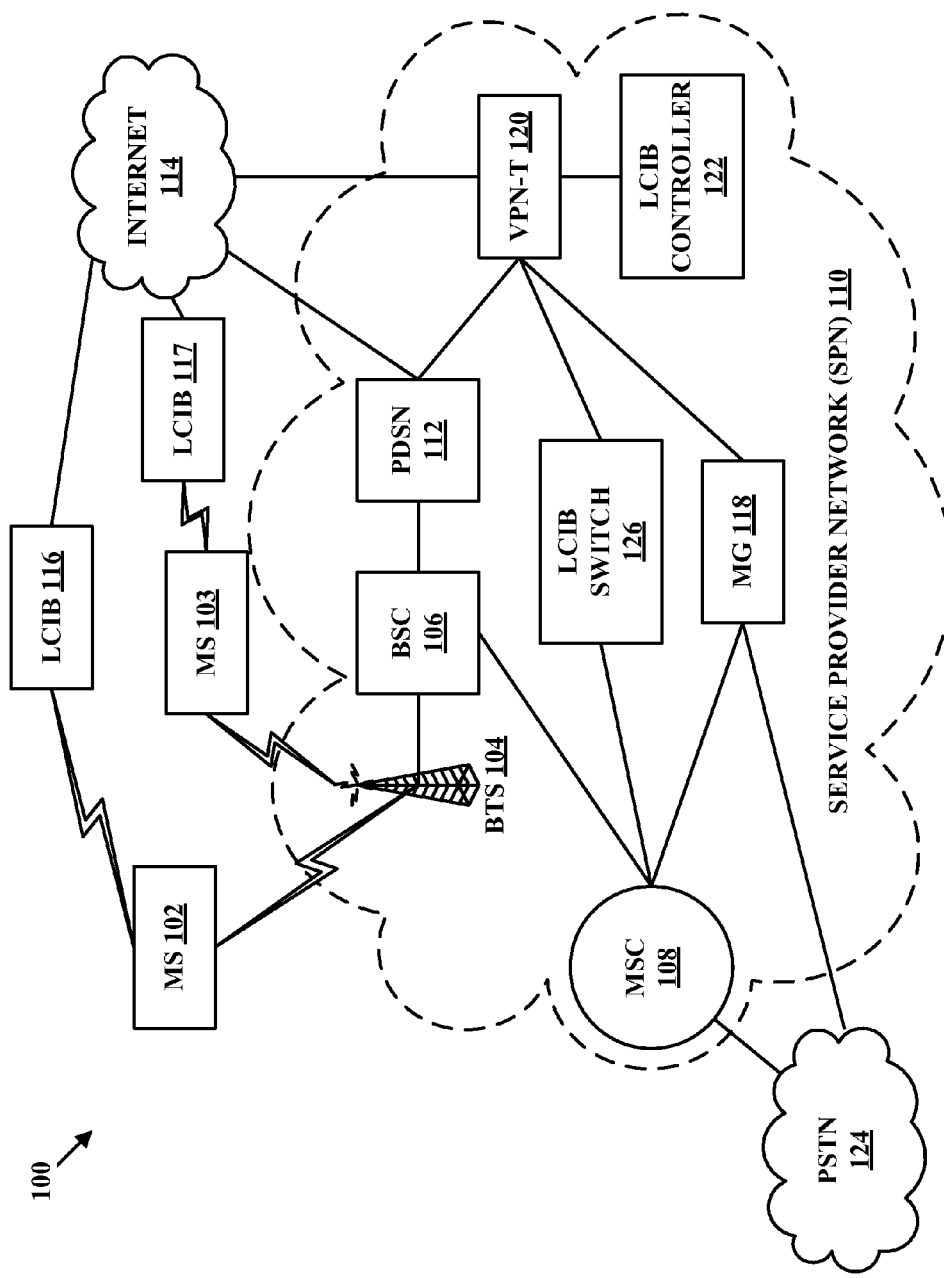
FIG. 1 is a simplified block diagram of a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a condominium, a house, etc. In an exemplary scenario, there may be two or more LCIBs densely deployed in close proximity to each other. However, when the density of LCIBs increases in such locations, the densely-deployed LCIBs could interfere with one another, and this interference could result in poor service or service interruptions.

For instance, the pilot beacons of each densely-deployed LCIB may interfere with each other. In general, an LCIB uses its pilot beacon to transmit administrative messages and parameters that mobile stations can use to facilitate handoffs from the macro network to the LCIB's single carrier. Thus, among the purposes of the LCIB's pilot beacon is to advertise that carrier in the LCIB's coverage area. As such, the LCIB transmits its pilot beacon on the one or more macro-network carriers in the surrounding area.

In particular, after an initial auto-configuration process, each LCIB will transmit either what is known as and referred to herein as a "fixed" pilot beacon, or what is known as and referred to herein as a "frequency-hopping" pilot beacon. If the one or more macro base stations in the surrounding area all operate on the same single carrier, then the LCIBs will each transmit their pilot beacon on only that carrier (i.e. a fixed pilot beacon). If, however, multiple carriers are provided by the surrounding macro-network, the LCIBs will cycle through those carriers, transmitting their pilot beacon on each carrier for some fixed period of time (i.e. a frequency-hopping pilot beacon), such as a few hundred milliseconds (ms) or perhaps one or two seconds.

Thus, since each of the two LCIBs in our exemplary scenario are transmitting their own pilot beacons in the same small geographic area, an undesirable phenomenon known as pilot-beacon collisions will likely occur. That is, each LCIB's pilot beacon will interfere with the other LCIB's pilot beacon, making each one more difficult for mobile stations to decode. Moreover, the presence of these competing pilot beacons will also provide undesirable interference with the macro network. Mobile stations may have trouble determining with which LCIB they should communicate, and it would certainly be possible that one of the two LCIBs would end up overloaded with mobile stations while the other LCIB could be underutilized. That is, load-balancing between the two LCIBs would be a matter of luck.

Other service interruptions due to LCIBs being densely deployed are possible as well. For example, interference between densely-deployed LCIBs may result in a dropped call for a mobile station operating under the coverage of the densely-deployed LCIBs.

As presently contemplated, in accordance with embodiments of the present invention, the operations of two or more densely-deployed LCIBs are configured such that the LCIBs can provide service preferably without interfering with one another.

In accordance with embodiments of the present invention, LCIBs may need a combination of software, firmware, and/or hardware that equips them with certain capabilities. One such capability is that the LCIB be able to operate according to densely-deployed operational parameters. Another such capability is that the LCIB be able to detect other LCIBs that are in close proximity to the LCIB.

In accordance with exemplary embodiments, an LCIB controller may be provided as an entity on the wireless service provider's core network, accessible to one or more of the LCIBs in a given LCIB system via a VPN connection over the subscriber's broadband Internet connection. The LCIB controller may be any logical and/or physical entity that has visibility to, communicates with, and provides configuration information to LCIBs, perhaps among other functions.

In addition to the LCIBs being provided with certain capabilities for carrying out the present invention, the LCIB controller may also have certain capabilities. A first such capability is the ability to determine that a plurality of LCIBs are densely deployed. A second such capability is the ability to establish densely-deployed operational parameters for a plurality of densely-deployed LCIBs. A third such capability is the ability to determine that at least one LCIB from the plurality of LCIBs is no longer densely deployed and, responsively, re-configure the other LCIB(s) to operate according to a set of standard operational parameters.

For the balance of this overview section, an example involving dense deployment of two LCIBs will be described. This is for illustration and not by way of limitation: any number of LCIBs may be densely deployed in accordance with the principles of the present invention. As an exemplary point for extending this two-LCIB example to more than two LCIBs, the description below of a first LCIB and a second LCIB could be extended to a first LCIB, a second LCIB, a third LCIB, etc.

A somewhat initial step in accordance with the present invention is to determine that the two LCIBs are densely deployed. This may be carried out by one or both of the LCIBs, and perhaps reported to the LCIB controller, or this may be carried out by the LCIB controller. As an example, the first LCIB may be powered on in a first subscriber's apartment building, and conduct an auto-configuration process, involving the first LCIB determining its own location (perhaps using its GPS receiver) and sending that location to the LCIB controller, and the LCIB controller providing the first LCIB with operational parameters (a carrier licensed by the service provider for that location, pseudorandom number (PN) offset, channel list message, etc.).

At some later time, a second subscriber may power on the second LCIB in the second subscriber's apartment building. The second LCIB may then conduct its own auto-configuration process, during which the second LCIB may send a location to the LCIB controller that is the same or at least close enough to the first LCIB's location, such that the controller will recognize their proximity. And instead of the auto-recognition described above, the LCIB may select respective densely-deployed operational parameters for the first LCIB and the second LCIB. For example, the controller may select a PN offset that the first and second LCIB will use. The LCIB controller may also select a transmission-power level that both the first and second LCIB will use. In some embodiments, the first and second LCIB may use different power levels. Next, the LCIB controller configures the first LCIB and the second LCIB to operate according to the respective densely-deployed operational parameters.

Beneficially, in accordance with an embodiment, by configuring the first and second LCIB to operate according to respective densely-deployed operational parameters, densely-deployed LCIBs will not interfere with one another.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes mobile stations (MS) 102 and 103, a macro BTS 104, a base station controller (BSC) 106, a mobile switching center (MSC) 108, a service provider network (SPN) 110, a packet data serving node (PDSN) 112, the Internet 114, LCIBs 116 and 117, a media gateway 118, a VPN terminator (VPN-T) 120, an LCIB controller 122, a public switched telephone network (PSTN) 124, and an LCIB switch 126. And additional entities could be present as well, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIBs 116 and 117 and Internet 114.

Mobile stations 102 and 103 may be any mobile devices arranged to carry out the mobile-station functions described herein. As such, mobile stations 102 and 103 may each include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 and/or 103 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102/103 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIBs 116 and 117 may each be any computing and communication device arranged to carry out the LCIB functions described herein. As such, LCIBs 116 and 117 may each include a communication interface, a processor, and data storage comprising instructions executable by the processor for carrying out those LCIB functions. The communication interface may include (a) a wireless interface for communicating with one or more mobile stations according to a protocol such as CDMA (and/or one or more other technologies) and (b) an Ethernet or WiFi interface for communicating with a device such as a router and/or a cable modem. Each LCIB may also have a GPS receiver and/or other location module. LCIBs 116 and 117 are also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, LCIB controller 122, LCIB switch 126, and Internet 114. In general, VPN terminator 120 functions to establish secure VPN connections over Internet 114 with LCIBs such as LCIBs 116 and 117, enabling the LCIBs to securely communicate with devices on SPN 110 and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIBs 116 and 117. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

b. An Exemplary LCIB

Figure 2:
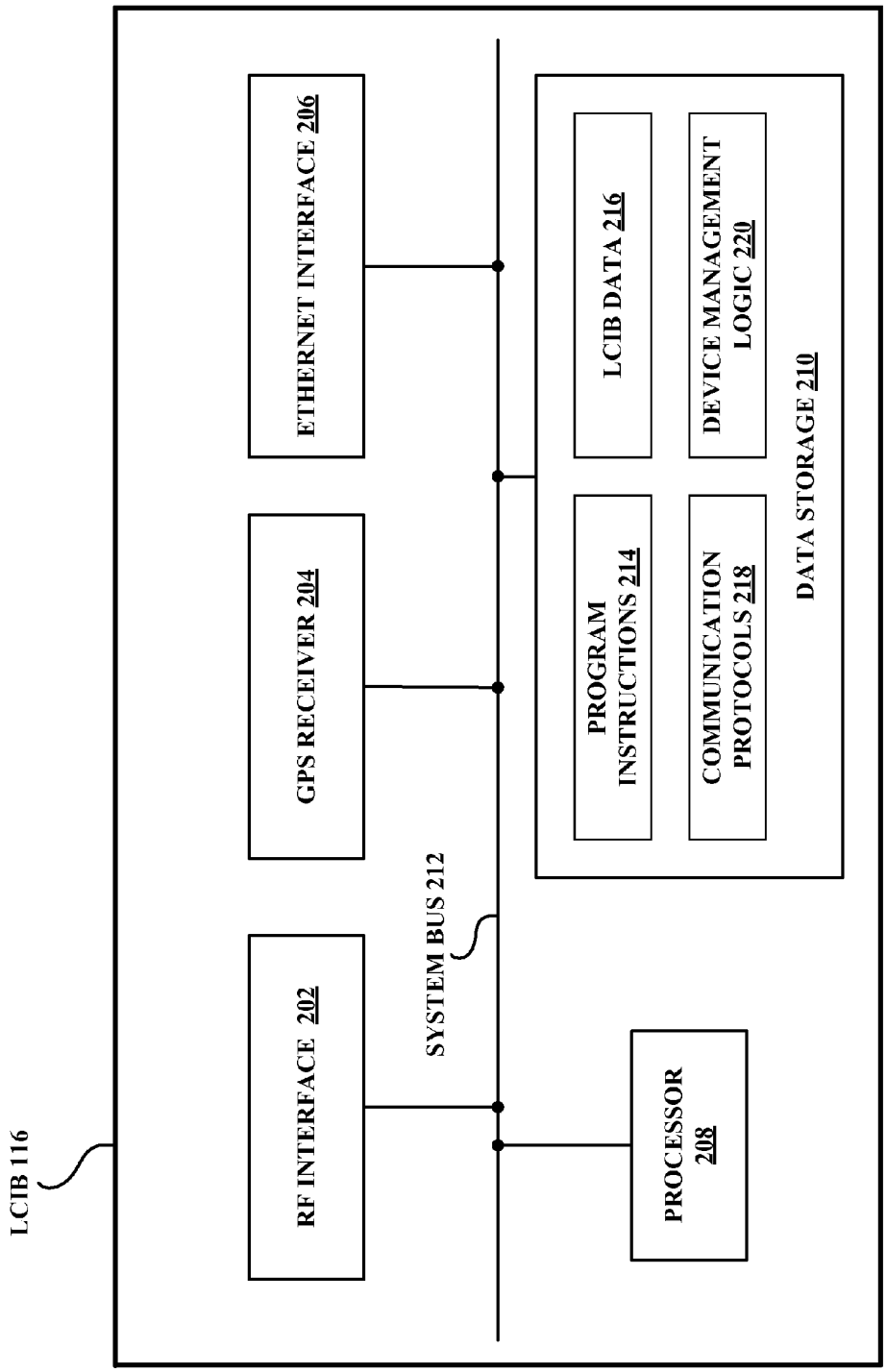
FIG. 2 is a simplified block diagram of an LCIB, in accordance with exemplary embodiments.

FIG. 2 depicts an exemplary diagram of LCIB 116 of FIG. 1. Note that LCIB 117 of FIG. 1 may have a similar set of components. As seen in FIG. 2, LCIB 116 includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
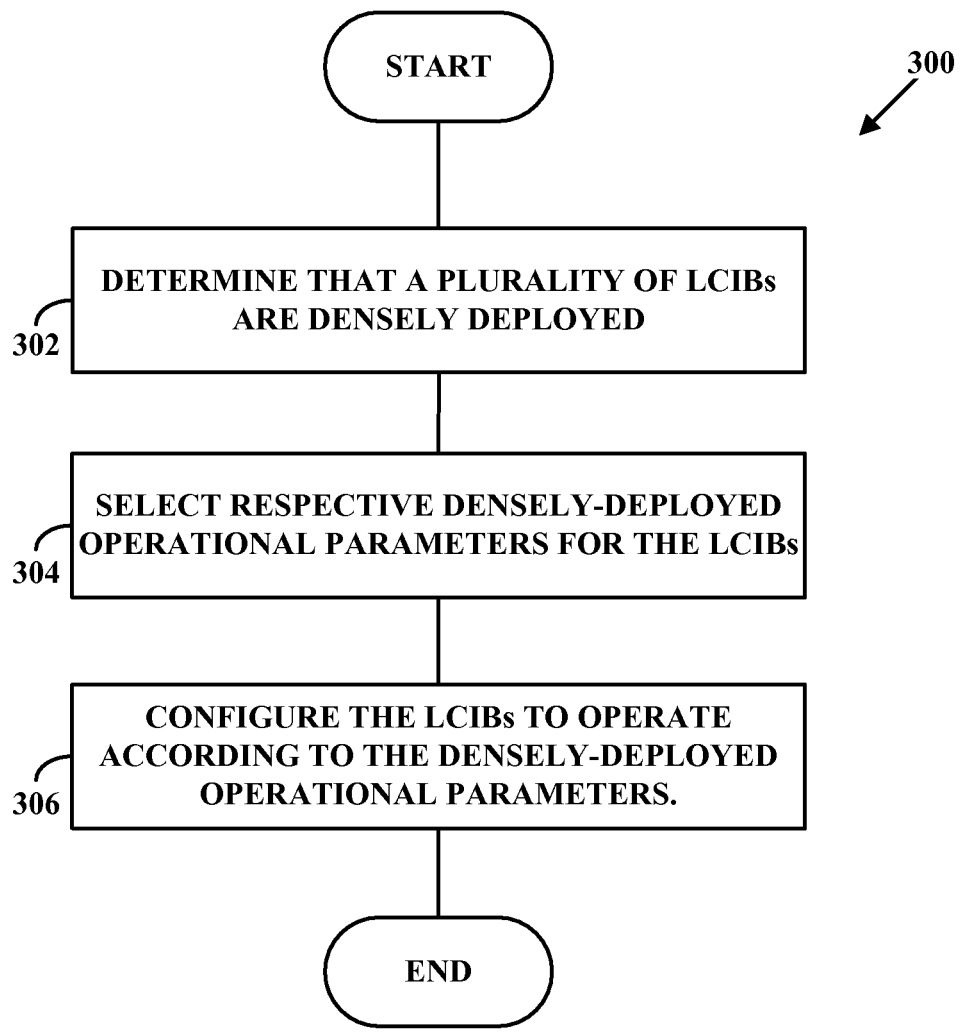
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when LCIB controller 122 determines that LCIBs 116 and 117 are densely deployed. At step 304, LCIB controller 122 selects respective densely-deployed operational parameters for LCIBs 116 and 117. At step 306, LCIB controller 122 configures LCIBs 116 and 117 to operate according to the respective densely-deployed operational parameters.

These steps are further explained in the following subsections. And it should be noted that, although method 300 is described as being carried out by LCIB controller 122, this is not required. In some embodiments, method 300 may be carried out by LCIB 116 or by LCIB 117. In general, method 300 could be carried out by any one or any combination of the network elements described herein, or any other network element(s). It should further be noted that method 300 is described with reference to two LCIBs, LCIBs 116 and 117. However, this is for illustration and not be way of limitation: any number of LCIBs may be densely deployed in accordance with principles of the present disclosure.

i. Determining that a Plurality of LCIBs are Densely Deployed

At step 302, LCIB controller 122 determines that LCIBs 116 and 117 are densely deployed. As described above, each of LCIB 116 and 117 may have a wireless-communication interface for providing a (e.g. CDMA) coverage area for at least one mobile station (e.g. mobile stations 102 and 103), a packet-data (e.g. Ethernet or WiFi) interface for communicating over at least one packet-data network (e.g. Internet 114) with LCIB controller 122, a processor, and data storage. For secure communication with LCIB controller 122, LCIB 116 and LCIB 117 may each, upon being powered on, establish a VPN connection with VPN terminator 120.

After being powered on and establishing their respective VPN connections, the LCIBs may undergo a configuration process, during which they will acquire their location using their GPS receivers, and then send a configuration request to LCIB controller 122, where the configuration request includes that location information. In response, LCIB controller 122 will transmit configuration data, such as one or more operational parameters, to the LCIBs. These parameters may include specification of a carrier on which to provide service, a PN offset to use, a transmission-power level, channel-list message contents, neighbor-list message contents, etc.

So, assuming LCIB 116 is the first in time to be powered on and undergo this configuration process, LCIB controller 122 will see LCIB 116 as operating alone, and LCIB controller 122 will thus instruct LCIB 116 to use a set of operational parameters. This set of operational parameters may comprise a first carrier, a first PN offset, a first power level, and to broadcast a pilot beacon (which may be either fixed or frequency-hopping, depending on the macro-network environment in that area) that includes a channel-list message that includes reference to that first carrier. Preferably, this set of operational parameters is a standard set of operational parameters that the LCIB is configured to operate according to in standard operating situations. For the purpose of this disclosure, it should be understood that a standard operating situation may be any situation that is not a densely-deployed situation.

Then, at some time thereafter, LCIB 117 is powered on, at which time it undergoes its configuration process. LCIB 117 sets up a VPN connection over Internet 114 with VPN terminator 120, and then sends a configuration request to LCIB controller 122 via that VPN connection. This configuration request includes the current GPS location of LCIB 117, as determined using its internal GPS receiver.

LCIB controller 122 may then determine that LCIBs 116 and 117 are densely deployed. Determining that LCIBs 116 and 117 are densely deployed may comprise determining that LCIBs 116 and 117 are within a predetermined proximity to one another. This determination may comprise comparing the GPS information of LCIBs 116 and 117 that the LCIBs included in their respective configuration requests. For example, the GPS information of LCIBs 116 and 117 may indicate that LCIBs 116 and 117 are with 50 feet of each other, or some similar number. Alternatively, determining that LCIBs 116 and 117 are densely deployed may comprise detecting that LCIBs are deployed in a certain geographical area. The geographical area may be an area having a radius of, for example, 100 feet, or may be a certain section or grid on a map or a certain building or set of buildings, among other examples.

Locations where LCIBs are likely to be densely deployed are numerous. For example, LCIBs may be densely deployed in an apartment building. As a particular example, a first tenant in an apartment building may operate LCIB 116 and a second tenant in an apartment across the hall from the first tenant may operate LCIB 117. In this situation, these LCIBs may be operating within 50 feet of each other, and it may be beneficial for these LCIBs to operate according to densely-deployed operational parameters in order to avoid interfering with one another. Other examples of locations LCIBs may be densely deployed include a condominium complex, a dormitory building, a hotel building, a motel building, an office building, and/or an office-building complex. Other locations are possible as well.

The predetermined proximity that an LCIB controller 122 references to determine whether LCIBs are densely deployed may vary. For example, the predetermined proximity could be 50 feet. Alternatively, the predetermined proximity could be 100 feet. Other examples are possible as well.

In some embodiments, the predetermined proximity used to define whether LCIBs are densely deployed may vary depending on the deployed LCIBs. For example, different LCIBs may have different ranges of operation. A powerful LCIB could have a range of 150 feet, while a smaller LCIB could have a range of 50 feet. In an example scenario, a first powerful LCIB with a range of 150 feet could be within 125 feet of a second powerful LCIB with a range of 150 feet. In such a scenario, the LCIB controller may determine that the first and second powerful LCIBs are within a predetermined proximity, and therefore, are densely deployed. In another example scenario, a first LCIB with a range of 50 feet could be within 125 feet of a second LCIB with a range of 50 feet. In such a scenario, the LCIB controller 122 may determine that the first LCIB and the second LCIB are not within a predetermined proximity and, therefore, are not densely deployed.

Alternatively, rather than LCIB controller 122 determining that a plurality of LCIBs are densely deployed, an LCIB may determine that it is densely deployed. For example, when LCIB 117 starts up, LCIB 117 could detect the presence of LCIB 116. LCIB 117 may maintain a list of PNs that only LCIBs are authorized to use. LCIB 117 may include an RF receiver that may scan the channel spectrum allocated to LCIBs. If LCIB 117 detects a PN on any channel allocated to LCIBs, then LCIB 117 may responsively conclude that an LCIB is near. LCIB 117 and/or LCIB 116 could then signal to the LCIB controller 122 that the LCIBs are densely deployed.

Alternatively, when LCIB 117 starts up, LCIB 116 could detect the presence of LCIB 117. When an LCIB detects the presence of another LCIB, the LCIB could trigger itself and the other LCIB to operate according to densely-deployed operational parameters. Selecting densely-deployed operational parameters and operating according to the selected parameters is described in more detail in the following subsections.

ii. Select Respective Densely-Deployed Operational Parameters for Each Respective LCIB in the Plurality At step 304, LCIB controller 122 selects respective densely-deployed operational parameters for each LCIB in the set of densely-deployed LCIBs. In this example, LCIB controller 122 selects operational parameters for LCIB 116 and LCIB 117. In particular, LCIB controller 122 selects respective densely-deployed operational parameters for LCIBs 116 and 117 so that the LCIBs do not interfere with one another.

The densely-deployed operational parameters may take a variety of forms. In an embodiment, the selection of the densely-deployed operational parameters is aimed at balancing between eliminating or minimizing interference between the LCIBs and not sacrificing much of the LCIB's operability (e.g. the LCIB's area of operation).

Selecting densely-deployed operational parameters may include adjusting the transmission-power level of the LCIBs. The transmission-power level determines an LCIB's area of operation. The transmission-power level may be adjusted to limit the area of operation of an LCIB. For example, an LCIB with a transmission-power level of +18 dbm may cover an area of approximately 5.3 million square feet, which corresponds to approximately an area of operation having a 1,300 foot radius. On the other hand, an LCIB with a transmission-power level of +1 dbm may cover an area of approximately 5,000 square feet, which corresponds to approximately an area of operation having a 40-foot radius. Transmission-power level may be adjusted to correspond to a desired area of operation. Therefore, when selecting densely-deployed operational parameters, the transmission-power level may be a factor.

In an embodiment, the respective densely-deployed parameters for each respective LCIB are selected such that each respective LCIB limits operation to a respective area, where no such respective area overlaps any other respective area. For example, if LCIBs 116 and 117 have range of operation having a 150-foot radius and are 250 feet apart from one another, the range of operation would overlap for approximately 50 feet. The operational parameters of LCIBs 116 and 117 could then be adjusted to lower the operation range of each LCIB to a radius of 125 feet. Therefore, the respective areas of operation of LCIBs 116 and 117 would no longer overlap. It should be understood that, depending on the particular scenario, the range of operation of each LCIB could be adjusted accordingly.

In an embodiment, selecting densely-deployed operational parameters may also comprise selecting channel parameters for LCIBs 116 and 117 that result in the LCIBs operating on different channels. Similarly, in an embodiment, selecting densely-deployed operational parameters may comprise selecting PN-offset parameters for LCIBs 116 and 117 that result in the LCIBs operating according to different PN offsets. The likelihood of LCIBs 116 and 117 interfering with one another is reduced when LCIBs 116 and 117 use different channels and operate according to different PN offsets.

Other densely-deployed operational parameters may include certain restriction parameters. The restriction parameters could, for example, limit the number of users an LCIB can support simultaneously. Additionally or alternatively, the restriction parameters could restrict the use of the LCIB to only pre-determined users (e.g., users on an allowed list). Still alternatively, the densely-deployed operational parameters could include parameters that disable such a restriction. Other restriction parameters are possible as well.

Densely-deployed parameters may also include priority-setting parameters. In an embodiment, these priority-setting parameters could make one type of communication a priority over another type of communication. For example, the densely-deployed parameters may include parameters that make voice calls a priority over other types of communication. For example, a densely-deployed parameter may be a parameter that makes make voice calls a priority over streaming video.

Densely-deployed parameters may also include hand-off parameters. These hand-off parameters may include parameters that affect hard hand-offs and soft hand-offs. Hand-off parameters may include parameters that set the distance from an LCIB at which a mobile station hands off to the macro-network. Densely-deployed parameters may increase or decrease this hand-off distance. Densely-deployed parameters could also enable or disable the ability to do a soft hand-off with another LCIB. If the densely-deployed parameters enable a soft hand-off, the densely-deployed parameters may also include parameters that increase or decrease the search window size.

Densely-deployed parameters may also include pilot-beacon parameters. For example, the densely-deployed parameters may include parameters that increase or decrease pilot-beacon dwell times. The densely-deployed parameters may also include parameters that synchronize the pilot beacons of densely-deployed LCIBs. Synchronizing the pilot beacons of densely-deployed LCIBs may reduce interference caused by pilot beacons.

Densely-deployed parameters may also include reverse-link-power parameters. For example, the densely-deployed parameters may include parameters that limit the reverse-link power to a specific value. Densely-deployed parameters may also include data-rate parameters. For example, the densely-deployed parameters may include parameters that limit the data rate on the reverse and/or forward link for packet-data calls.

Densely-deployed parameters may also include paging parameters. For example, the densely-deployed parameters may include parameters that result in a page being sent to all of the densely-deployed LCIBs in a densely-deployed zone. In a densely-deployed situation, a mobile station may latch onto another LCIB that is not its own. If a page is only sent to the mobile station's own LCIB, the mobile station may miss the page. However, the densely-deployed parameters may include parameters that result in a page being sent to all of the densely-deployed LCIBs. In this case, a mobile station latched onto another LCIB would receive a page even when the mobile station is not operating on its own LCIB.

Other parameters that would affect and/or improve performance of densely-deployed LCIBs may also be selected as densely-deployed operational parameters.

It should be understood that the respective densely-deployed operational parameters selected for each LCIB may comprise at least one of or a combination of the types of densely-deployed operational parameters discussed above.

As mentioned above, the predetermined proximity that LCIB controller 122 references to determine whether LCIBs are densely deployed may vary depending on the transmission-power levels of the LCIB. In an embodiment, the LCIB controller could use such information in selecting the densely-deployed parameters to use. For example, LCIB 116 may have a transmission-power level that creates a radius of operation of 100 feet and LCIB may have a transmission-power level that creates a radius of operation of only 30 feet. LCIB 116 and LCIB 117 may be within 100 feet of each other. LCIB controller 122 could, for example, select densely-deployed operational parameters for LCIB 116 that limits its range of operation to a 75-foot radius and densely-deployed operational parameters for LCIB 117 that limit its range of operation to a 25-foot radius. Other examples and scenarios are possible as well.

Iii. Configure Each Respective LCIB to Operate According to the Densely-Deployed Operational Parameters At step 306, LCIB controller 122 configures LCIB 116 and LCIB 117 to operate according to the respective densely-deployed operational parameters. Thus, LCIB controller 122 may transmit instructions to LCIB 116 that indicate to LCIB 116 the densely-deployed operational parameters according to which LCIB 116 should operate. For example, LCIB controller 122 may transmit information to LCIB 116 as to what channel, PN offset, power level, etc. LCIB 116 should use for its own operations. Further, LCIB controller 122 may transmit instructions to LCIB 117 that indicate to LCIB 117 the densely-deployed operational parameters according to which LCIB 117 should operate.

In an embodiment, responsive to configuring each respective LCIB to operate according to respective densely-deployed operational parameters, the LCIB controller and/or each respective LCIB may alert a respective operator of each respective LCIB that the respective LCIB is operating in a densely-deployed operational mode. For instance, each LCIB may comprise a user interface having a screen, and the screen may indicate to the user that the LCIB is operating in a densely-deployed operational mode.

In an exemplary embodiment, the densely-deployed LCIBs operate according to the respective densely-deployed operational parameters until the LCIBs are no longer densely deployed. In this embodiment, method 300 further comprises determining that at least one LCIB from the plurality of LCIBs is no longer densely deployed. In our exemplary scenario, LCIB 116 and LCIB 117 may operate according to the respective densely-deployed operational parameters until one of the LCIBs is no longer registered. For example, a user of LCIB 117 may shut down LCIB 117 and LCIB 117 would, therefore, no longer be registered. In this situation, LCIB controller 122 could then responsively re-configure LCIB 116 to operate according to a set of standard operational parameters.

In accordance with an embodiment, the LCIB controller may check the registration status of each LCIB in the plurality of LCIBs in order to aid in determining whether each LCIB remains densely deployed. After checking the registration status of each LCIB, the LCIB controller may determine that at least one LCIB from the plurality of LCIBs is no longer registered. The LCIB controller may responsively conclude that the at least one LCIB from the plurality is no longer densely deployed. In the case where LCIBs 116 and 117 are the only densely-deployed LCIBs, LCIB controller 122 could determine that one of the LCIBs is no longer densely-deployed when LCIB controller 122 determines that the other LCIB is no longer registered.

In the case of more than two densely-deployed LCIBs, determining that at least one LCIB from the plurality of LCIBs is no longer densely deployed may comprise determining that the at least one LCIB is not within a predetermined proximity of the other LCIBs still operating. For instance, in the case of three densely-deployed LCIBs, a scenario is possible where, even if one of the LCIBs is no longer registered, the other two LCIBs remain densely deployed. In this case, the remaining LCIBs may continue to operate according to densely-deployed operational parameters. In an embodiment, the remaining LCIBs may continue to operate according to the same densely-deployed operational parameters. However, in another embodiment, the remaining LCIBs may continue to operate according to densely-deployed operational parameters, but the parameters could be adjusted. For example, the LCIB controller may adjust the densely-deployed operational parameters for the remaining LCIBs.

Preferably, the LCIB controller periodically checks the registration status of each LCIB in the plurality. For example, periodically checking the registration status of the plurality of LCIBs may comprise checking the registration status every 6-24 hours. It should be understood, however, that this periodic checking may be more often or less often than every 6-24 hours.

b. A Second Exemplary Method

Figure 4:
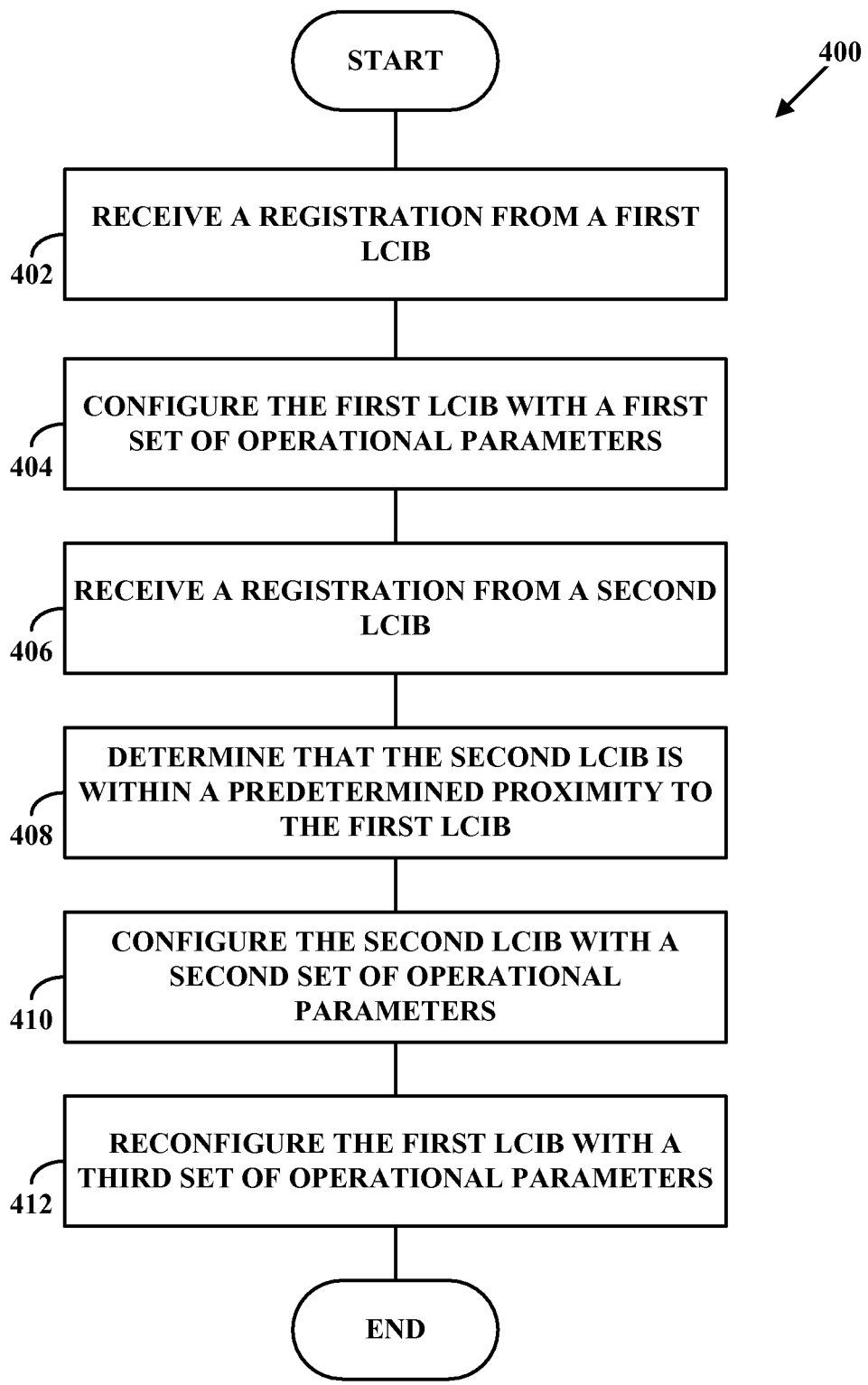
FIG. 4 is a flowchart of a method, in accordance with exemplary embodiments.

FIG. 4 is a flowchart of a second exemplary method, in accordance with an exemplary embodiment. Note that method 400 may be carried out by an LCIB and/or an LCIB controller, such as LCIB 116, LCIB 117, and/or LCIB controller 122; furthermore, method 400 is related in some respects to method 300, and thus is not described in as great of detail. It should be explicitly noted, however, that any possibilities and permutations described above with respect to method 300 may equally apply to method 400.

As shown in FIG. 4, method 400 begins at step 402, when an LCIB controller receives a registration from a first LCIB. At step 404, the LCIB controller configures the first LCIB to operate according to a first set of operational parameters. The first set may be standard operational parameters for LCIB 116. Next, at step 406, the LCIB controller receives a registration from a second LCIB. At step 408, the LCIB controller and/or the first and second LCIB determine that the second LCIB is within a predetermined proximity to the first LCIB. Responsively, at step 410, the LCIB controller configures the second LCIB to operate according to a second set of operational parameters. Further, at step 412, the LCIB controller re-configures the first LCIB to operate according to a third set of operational parameters, where the second and third sets are different than the first set.

The second set of operational parameters may be the same as the third set of operational parameters. Alternatively, the second set of operational parameters may be different than the third set of operational parameters.

4. Conclusion

Various exemplary embodiments have been described above. Those skilled in the art will understand, however, that changes and modifications may be made to those examples without departing from the scope of the claims.

What is claimed is:

1. A method in a communication system that includes a plurality of macro base stations and a plurality of low-cost Internet base stations (LCIBs), the method comprising:

an LCIB controller determining a location of each of the plurality of LCIBs;

based at least on the determined locations, the LCIB controller determining that the plurality of LCIBs are densely deployed;

in response to the determination that the plurality of LCIBs are densely deployed, the LCIB controller (i) selecting respective operational parameters for each respective LCIB in the plurality and (ii) configuring each respective LCIB in the plurality to operate according to the respective operational parameters selected for the respective LCIB, so as to reduce interference between the plurality of LCIBs, wherein each LCIB in the plurality of LCIBs also has a respective set of standard operational parameters, wherein the plurality of LCIBs comprises a first LCIB and a second LCIB, and wherein the first LCIB is operating within a predetermined proximity to the second LCIB; and after configuring each respective LCIB in the plurality to operate according to the respective operational parameters, the LCIB controller (i) determining that the first LCIB is no longer densely deployed, wherein determining that the first LCIB is no longer densely deployed comprises (a) checking a registration status of the second LCIB, (b) determining that the second LCIB is no longer registered, and (c) in response to determining that the second LCIB is no longer registered, concluding that the second LCIB is no longer operating within a predetermined proximity to the first LCIB, and (ii) in response to determining that the first LCIB is no longer densely deployed, re-configuring the first LCIB to operate according to a set of standard operational parameters.

2. The method of claim 1, wherein determining that the plurality of LCIBs are densely deployed comprises determining that all the LCIBs of the plurality of LCIBs are deployed in a certain geographical area.

3. The method of claim 1, wherein determining that the plurality of LCIBs are densely deployed comprises determining that each LCIB in the plurality of LCIBs is within a predetermined proximity to at least one other LCIB in the plurality of LCIBs.

4. The method of claim 1, wherein the respective operational parameters for each respective LCIB are selected such that each respective LCIB limits operation to a respective area, wherein no such respective area overlaps any other such respective area.

5. The method of claim 1, wherein checking the registration status of the second LCIB comprises periodically checking the registration status of the second LCIB.

6. The method of claim 1, wherein the plurality of LCIBs are located in an apartment building, a condominium complex, a dormitory building, a hotel building, an office building, or an office-building complex.

7. The method of claim 1, further comprising:
responsive to configuring each respective LCIB in the plurality to operate according to the respective operational parameters, alerting a respective operator of each respective LCIB in the plurality that the respective LCIB is operating in a densely-deployed mode.

8. The method of claim 1, wherein the operational parameters comprise parameters selected from the group consisting of transmission-power-level parameters, PN-offset parameters, channel-selection parameters, user-restriction parameters, hand-off parameters, pilot-beacon parameters, reverse-link-power parameters, data-rate parameters, paging parameters, and priority-setting parameters.

9. The method of claim 3, wherein each LCIB in the plurality of LCIBs comprises a Global Positioning System (GPS) receiver, and wherein determining that each LCIB in the plurality of LCIBs is within a predetermined proximity to at least one other LCIB in the plurality of LCIBs comprises comparing GPS information of each LCIB to GPS information of at least one other LCIB in the plurality of LCIBs.

10. The method of claim 3, wherein the predetermined proximity to at least one other LCIB in the plurality of LCIBs is less than 100 feet.

11. The method of claim 5, wherein periodically checking the registration status of the second LCIB comprises checking the registration status of the second LCIB every 6-24 hours.

12. A method in a communication system that includes a plurality of macro base stations, a first low-cost Internet base station (LCIB), and a second LCIB, the method comprising:
receiving a registration from the first LCIB;
configuring the first LCIB to operate according to a first set of operational parameters;
receiving a registration from the second LCIB;
determining a location of each of the first LCIB and the second LCIB;
based at least on the determined locations, determining that the second LCIB is within a predetermined proximity to the first LCIB;
in response to determining that the second LCIB is within a predetermined proximity to the first LCIB, (i) configuring the second LCIB to operate according to a second set of operational parameters, and (ii) re-configuring the first LCIB to operate according to a third set of operational parameters so as to limit interference between the first LCIB and the second LCIB, wherein the second and third sets are each different from the first set; and
after re-configuring the first LCIB to operate according to a third set of operational parameters, (i) determining that the second LCIB is no longer operating within a predetermined proximity to the first LCIB, wherein determining that the second LCIB is no longer operating within a predetermined proximity to the first LCIB comprises (a) checking a registration status of the second LCIB, (b) determining that the second LCIB is no longer registered, and (c) in response to determining that the second LCIB is no longer registered, concluding that the second LCIB is no longer operating within a predetermined proximity to the first LCIB, and (ii) in response to determining that the second LCIB is no longer operating within a predetermined proximity to the first LCIB, re-configuring the first LCIB to operate according to the first set of operational parameters.

13. The method of claim 12, wherein the second set of operational parameters is the same as the third set of operational parameters.

14. The method of claim 12, wherein the second set of operational parameters is different than the third set of operational parameters.

15. A system located in a communication system that includes a plurality of macro base stations and a plurality of low-cost Internet base stations (LCIBs), the system comprising:
a communication interface;
a processor; and
data storage comprising instructions executable by the processor to:
determine a location of each of the plurality of LCIBs;
based at least on the determined locations, determine that the plurality of LCIBs are densely deployed;
in response to the determination that the plurality of LCIBs are densely deployed, (i) select respective operational parameters for each respective LCIB in the plurality and (ii) configure each respective LCIB in the plurality to operate according to the respective operational parameters selected for the respective LCIB, so as to reduce interference between the plurality of LCIBs, wherein each LCIB in the plurality of LCIBs also has a respective set of standard operational parameters, wherein the plurality of LCIBs comprises a first LCIB and a second LCIB, and wherein the first LCIB is operating within a predetermined proximity to the second LCIB; and after configuring each respective LCIB in the plurality to operate according to the respective operational parameters, (i) determine that the first LCIB is no longer densely deployed, wherein determining that the first LCIB is no longer densely deployed comprises (a) checking a registration status of the second LCIB, (b) determining that the second LCIB is no longer registered, and (c) in response to determining that the second LCIB is no longer registered, concluding that the second LCIB is no longer operating within a predetermined proximity to the first LCIB, and (ii) in response to the determination that the first LCIB is no longer densely deployed, re-configure the first LCIB to operate according to a set of standard operational parameters.

16. The system of claim 15, wherein the system comprises an LCIB controller.

* * * * *